(12) United States Patent
Le Meur et al.

(10) Patent No.: US 8,416,992 B2
(45) Date of Patent: Apr. 9, 2013

(54) DEVICE AND METHOD FOR CREATING A SALIENCY MAP OF AN IMAGE

(75) Inventors: Olivier Le Meur, Talensac (FR); Dominique Thoreau, Cesson Sevigne (FR); Philippe Salmon, Saint Sulpice la Foret (FR); Dominique Barba, Carquefou (FR); Patrick Le Callet, Le Pallet (FR)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 11/795,001

(22) PCT Filed: Jan. 10, 2006

(86) PCT No.: PCT/EP2006/050110
§ 371 (c)(1),
(2), (4) Date: Mar. 12, 2008

(87) PCT Pub. No.: WO2006/072637
PCT Pub. Date: Jul. 13, 2006

(65) Prior Publication Data
US 2008/0304708 A1 Dec. 11, 2008

(30) Foreign Application Priority Data
Jan. 10, 2005 (EP) .................................. 05290062

(51) Int. Cl.
*G06K 9/00* (2006.01)
(52) U.S. Cl. ...................................................... 382/107
(58) Field of Classification Search ................. 382/107, 382/209, 284; 348/441, E17.001; 375/240.12
See application file for complete search history.

(56) References Cited

U.S. PATENT DOCUMENTS

| 5,793,435 | A  | * | 8/1998 | Ward et al. .................... 348/448 |
| 2004/0086046 | A1 | * | 5/2004 | Ma et al. .................. 375/240.16 |
| 2005/0068465 | A1 | * | 3/2005 | Van Dijk ....................... 348/699 |

OTHER PUBLICATIONS (N. Courty et al; "Visual perception based on salient features", IEEE, US, vol. 4 of 4, Oct. 27, 2003, pp. 1024-1029, XP010672640 ISBN: 0-7803-7860-1).*
(Callet et al, "Frequency and spatial pooling of Visual differences for still image", proceeding of SPIE, vol. 3959, (2000)).*
le Meur et al (A Spatio-temporal model of the selective Human visual attention, 2005 IEEE).*
Courty et al; "Visual perception based on salient features", IEEE, US, vol. 4 of 4, Oct. 27, 2003, pp. 1024-1029, XP010672640 ISBN: 0-7803-7860-1.*
O. Le Meur et al: "A Spatio-Temporal Model of the Selective Human Visual Attention" Image Processing, 2005, ICIP 2005. IEEE Int'l Conference on Genova, Italy Sep. 11-14, 2005, pp. 1188-1191.
N. Courty et al; "Visual perception based on salient features" Proceedings of the 2003 IEEE/ RSJ Int'l Conference on Intelligent Robots and Systems; Las Vegas, NV, Oct. 27-31, 2003, vol. vol. 4 of 4, pp. 1024-1026.
O. Le Meur et al: From low-level perception to high-level perception: a coherent approach for visual attention modeling Proceedings of the SPIE, SPIE, Bellingham, VA, vol. 5292, No. 1, 2004, pp. 284-295.
Search Report Dated March 28, 2006.

* cited by examiner

*Primary Examiner* — Le Vu
(74) *Attorney, Agent, or Firm* — Robert D. Shedd; Jeffrey M. Navon

(57) ABSTRACT

Detection of the salient points in an image enable the improvement of further steps such as coding or image indexing, watermarking, video quality estimation. The methods rely on the fact that a model is fully based on the human visual system (HVS) such as the computation of early visual features, and the methods compute a saliency map for video images taking into account motion and the velocity of the eye.

6 Claims, 10 Drawing Sheets

Figure 1:
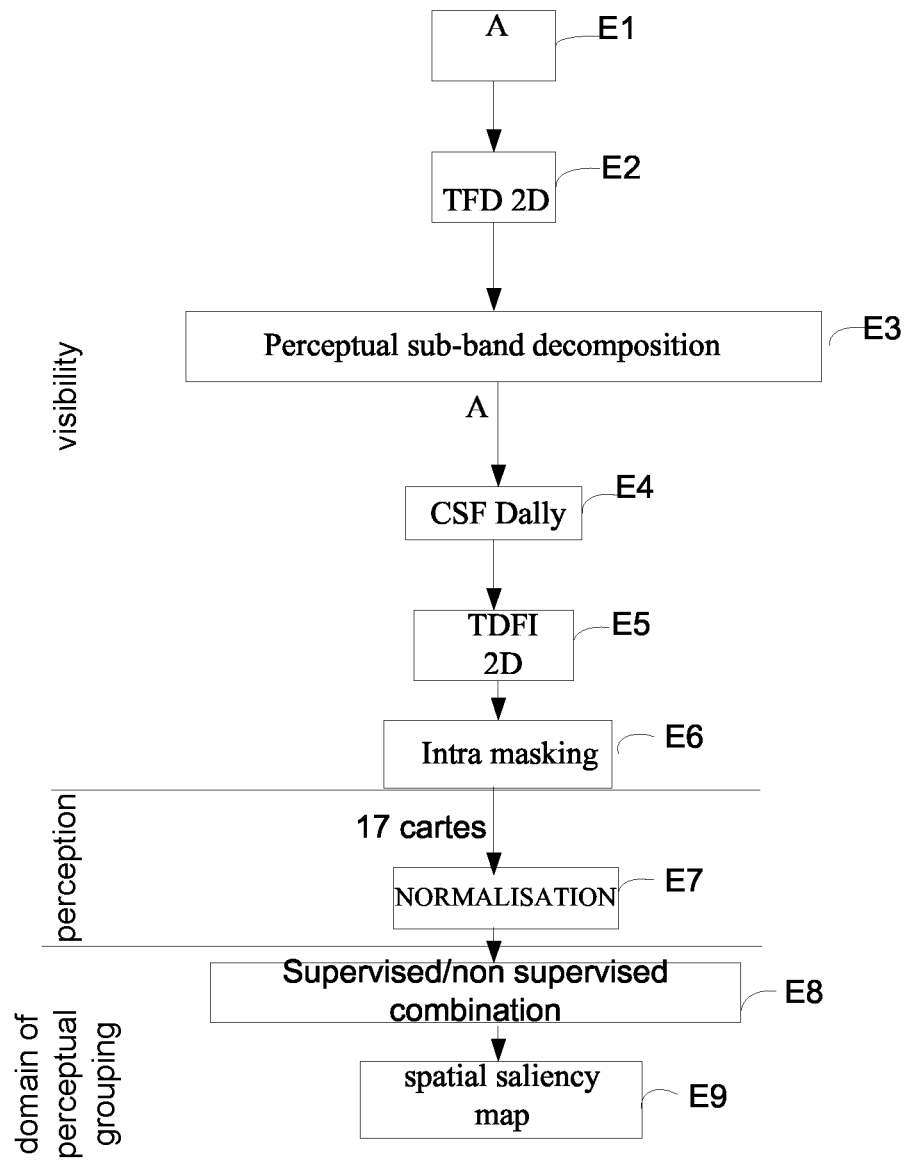

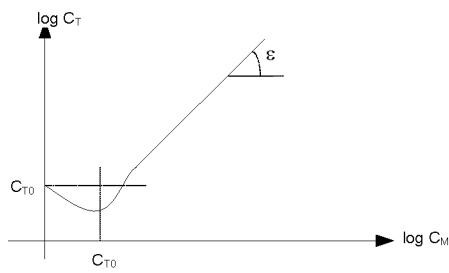
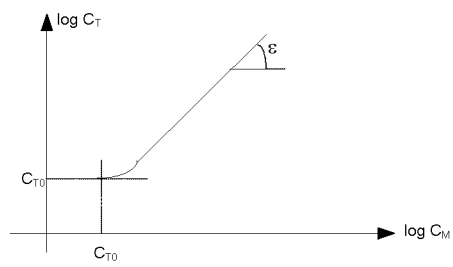
Fig 6a              Fig 6b
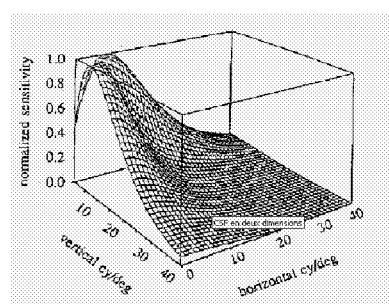
Fig 5
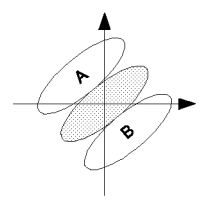
Fig 11

DEVICE AND METHOD FOR CREATING A SALIENCY MAP OF AN IMAGE

This application claims the benefit, under 35 U.S.C. §365 of International Application PCT/EP20065/050110, filed Jan. 10, 2006, which was published in accordance with PCT Article 21(2) on Jul. 13, 2006 in English and which claims the benefit of European patent applications No. 05290062.8, filed Jan. 10, 2005.

The invention is related to a device and a method for creating a temporal saliency map of an image.

The human information processing system is intrinsically a limited system and especially for the visual system. In spite of the limits of our cognitive resources, this system has to face up to a huge amount of information contained in our visual environment. Nevertheless and paradoxically, humans seem to succeed in solving this problem since we are able to understand our visual environment.

It is commonly assumed that certain visual features are so elementary to the visual system that they require no attentional resources to be perceived. These visual features are called pre-attentive features.

According to this tenet of vision research, human attentive behavior is shared between pre-attentive and attentive processing. As explained before, pre-attentive processing, so-called bottom-up processing, is linked to involuntary attention. Our attention is effortless drawn to salient parts of our view. When considering attentive processing, so-called top-down processing, it is proved that our attention is linked to a particular task that we have in mind. This second form of attention is thus a more deliberate and powerful one in the way that this form of attention requires effort to direct our gaze towards a particular direction.

The detection of the salient points in an image enable the improvement of further steps such as coding or image indexing, watermarking, video quality estimation.

The known approaches are more or less based on non-psycho visual features. In opposition with such methods, the proposed method relies on the fact that the model is fully based on the human visual system (HVS) such as the computation of early visual features.

In a first aspect, the invention proposes a method for creating a saliency map of an image comprising the step of hierarchical decomposition of the image into frequential sub-bands, According to the invention, the method comprises the steps of
  Movement estimation between the current image and a preceding image calculated from the decomposition into frequential sub-bands, estimating a dominant movement for the image and a local movement for each pixel of the current image,
  Creation of a temporal saliency map obtained from the global and local movement estimation.

According to a preferred embodiment, further to the step of frequency sub-band decomposition, the method comprises a step of orientation-based decomposition giving a perceptual sub-band decomposition.

According to a preferred embodiment, the method comprises a step of intra masking of the different perceptual sub-bands.

According to a preferred embodiment, the method comprises
  a step of construction of a four-level pyramid,
  a step of calculating a local motion vector for each pixel for each resolution level of the pyramid.

According to a preferred embodiment, the method comprises a step of obtaining a parametric model of the dominant movement of the image for each pixel of the image by using the local motion vectors obtained from the full resolution level of said obtained pyramid.

According to a preferred embodiment, the method comprises a step of obtaining a relative motion vector for each pixel of the image, being the difference between the local motion estimation and the dominant movement of the image of said pixel.

According to a preferred embodiment, the method comprises a step of weighting the relative motion vector with the maximum pursuit velocity of the eye.

According to a preferred embodiment, the method comprises a step of computing an histogram of the relative motion vectors of an image in order to obtain a normalized temporal saliency map.

According to a preferred embodiment, the method comprises a step of computing a spatial saliency map of said image and a step of fusion of said normalized temporal saliency map and of said spatial saliency map.

Figure 2:
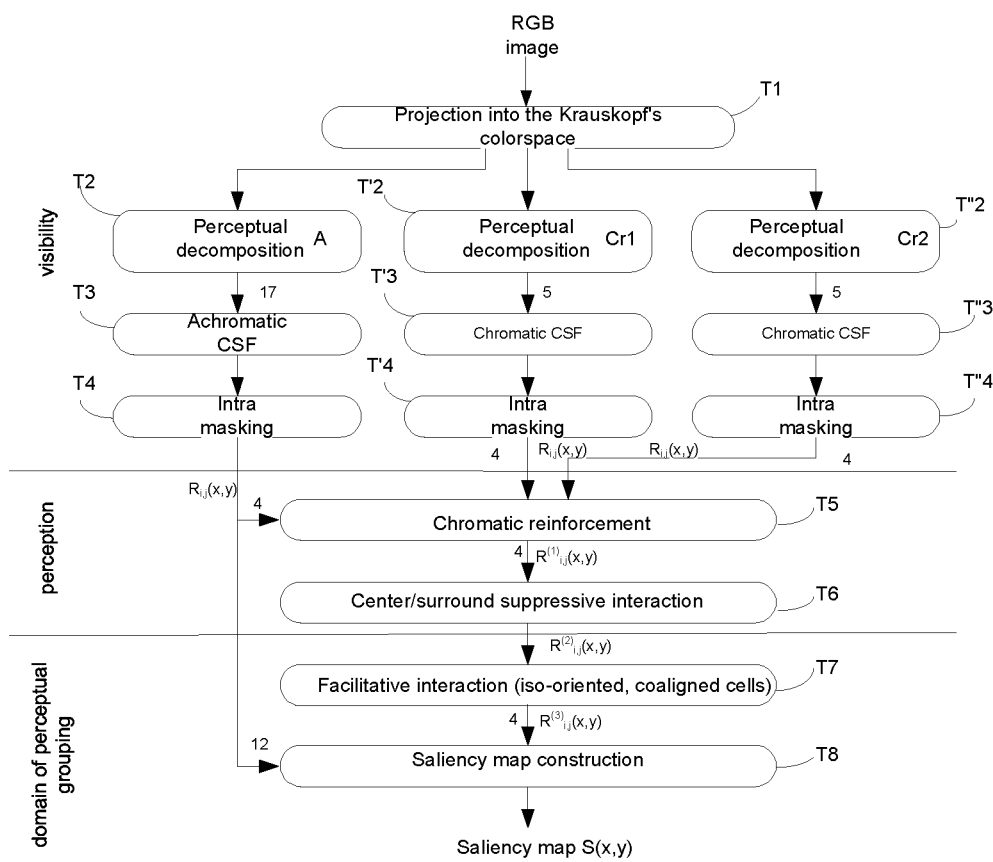
Figure 3:
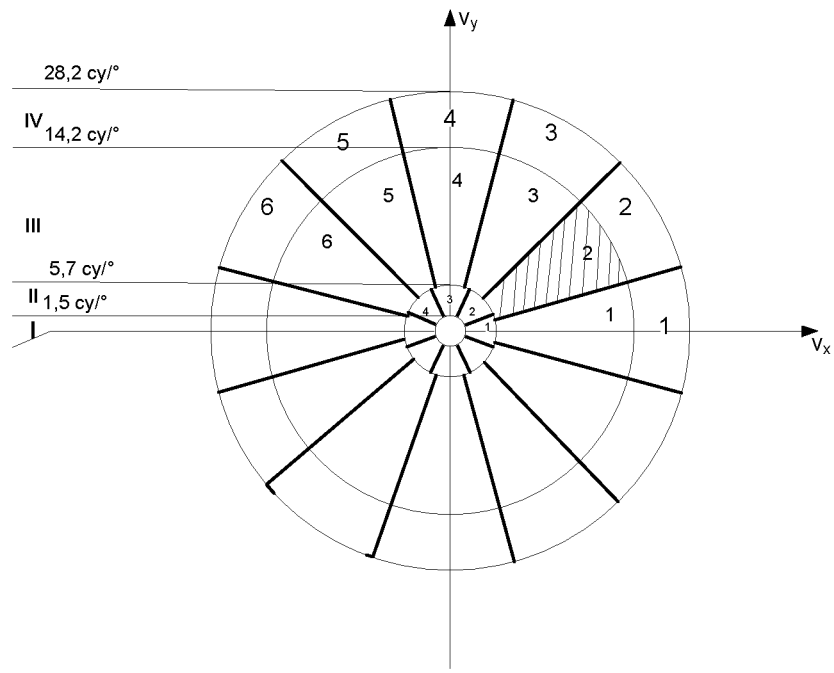
Figure 4:
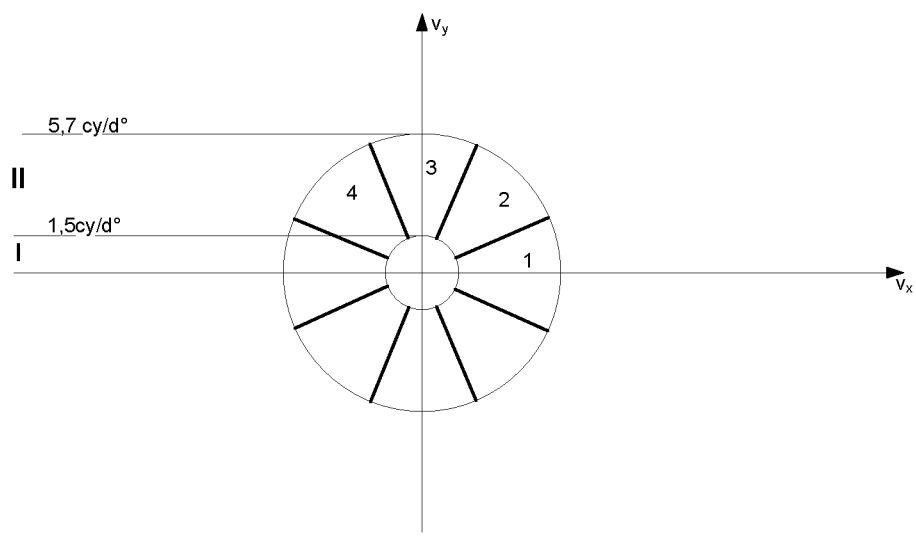
Figure 7:
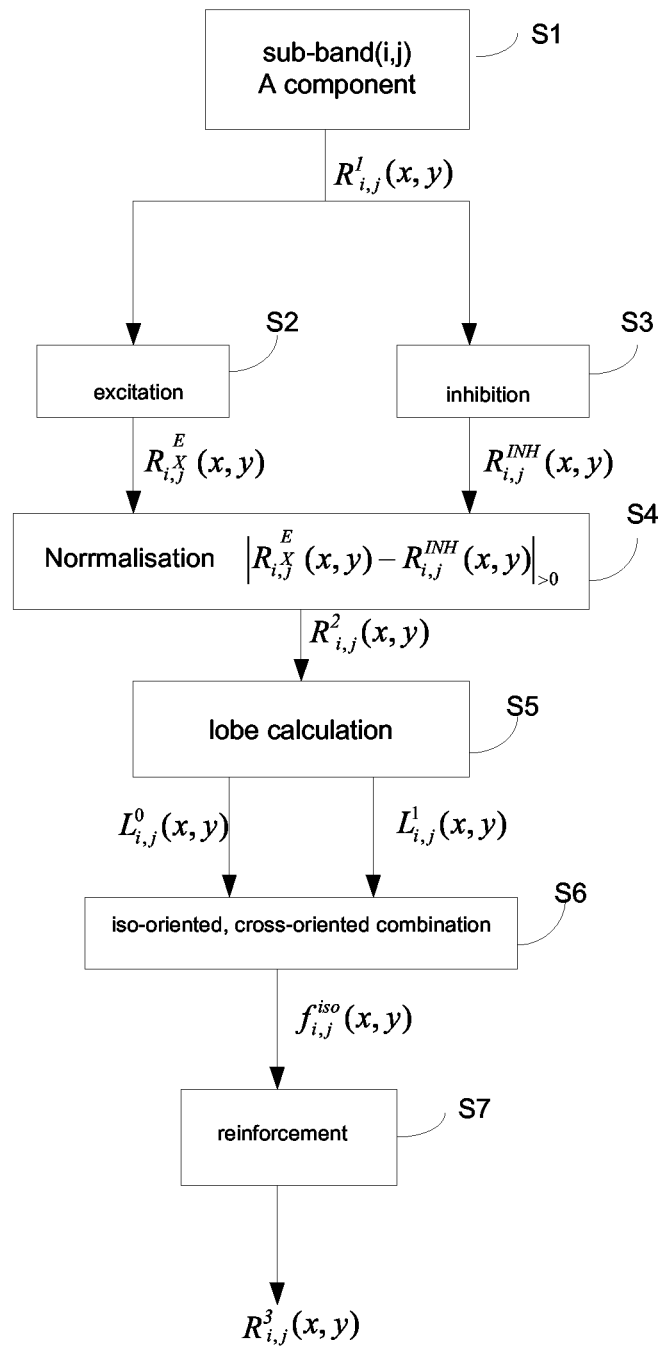
Figure 8:
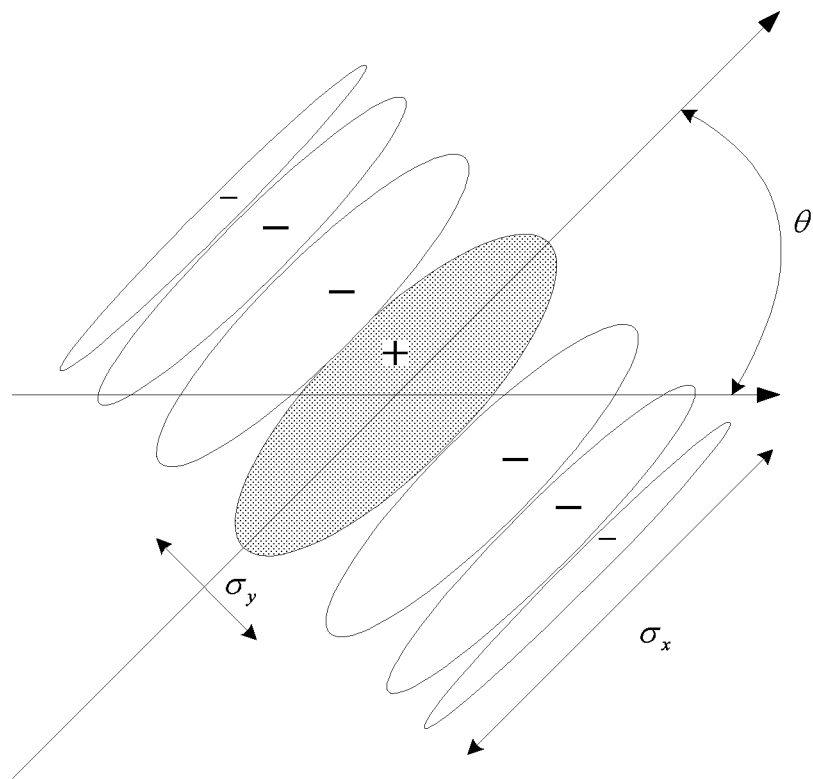
Figure 9:
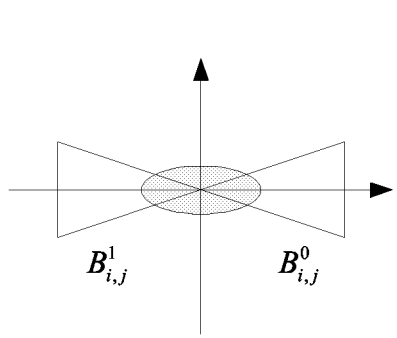
Figure 10:
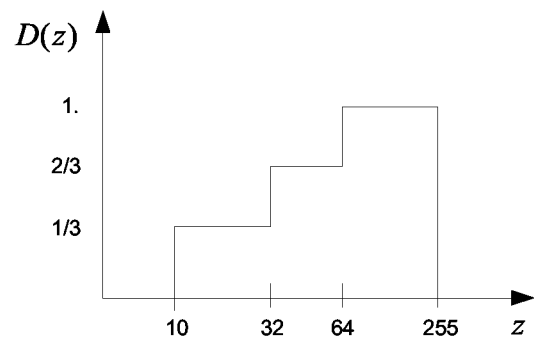
Figure 12:
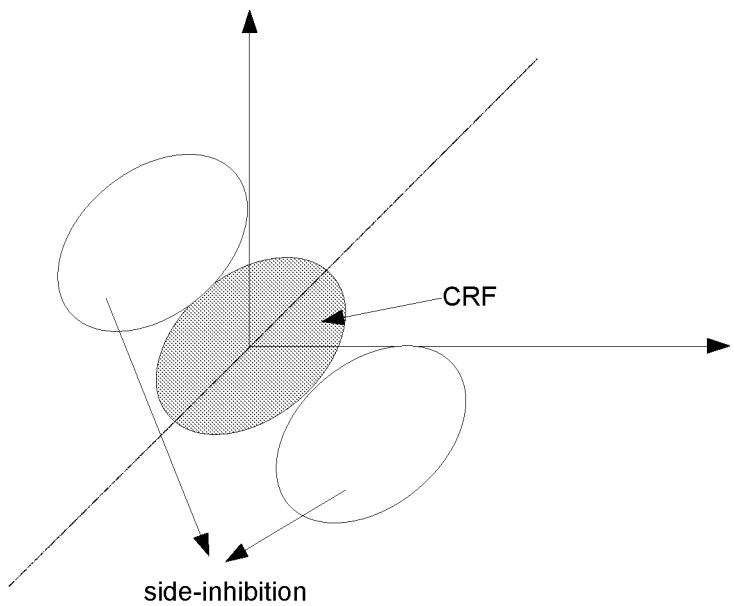
Figure 13:
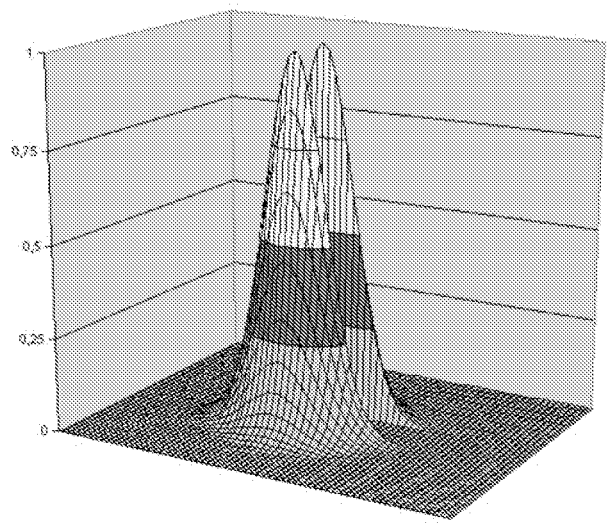
Figure 14:
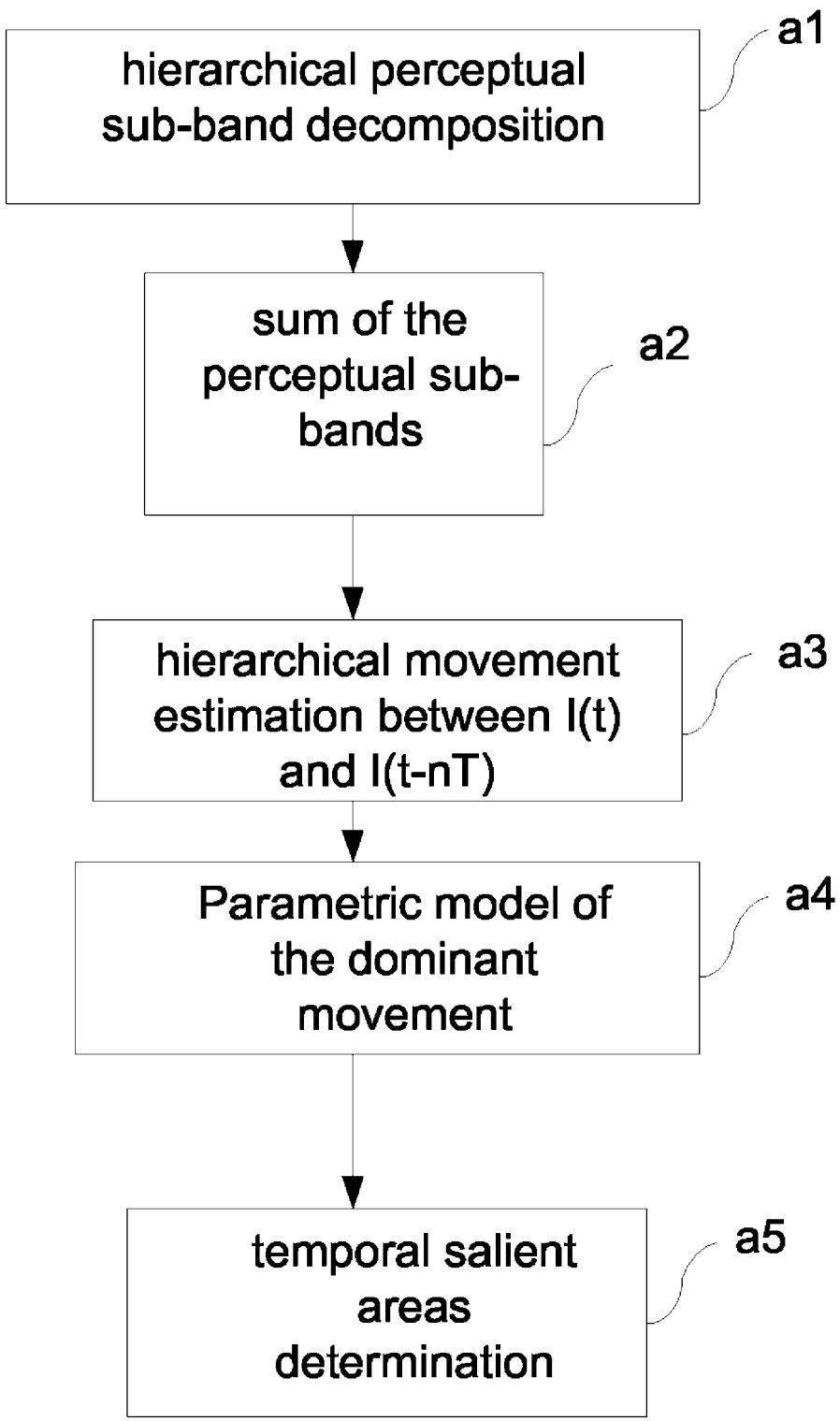
Figure 15:
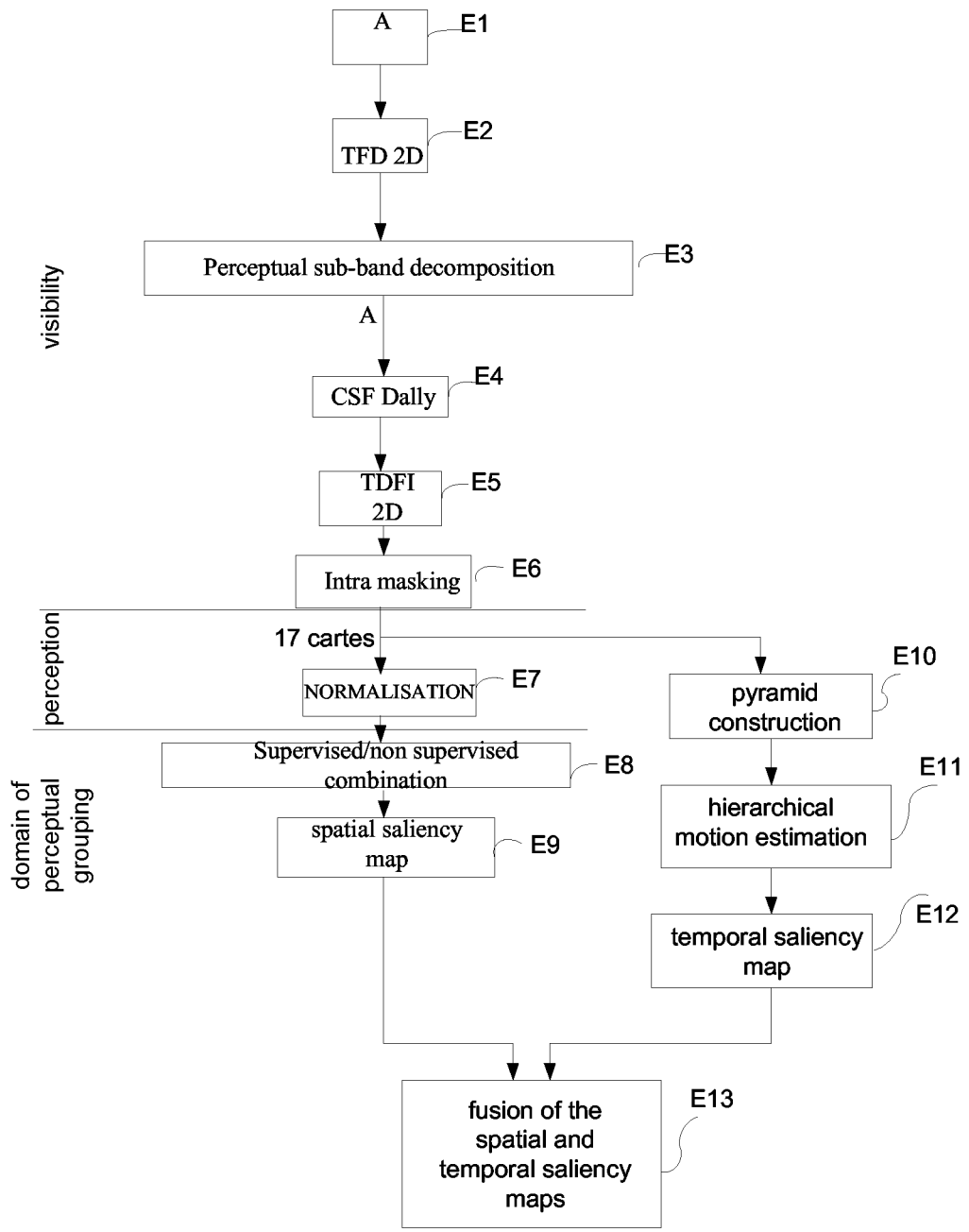
Figure 16:
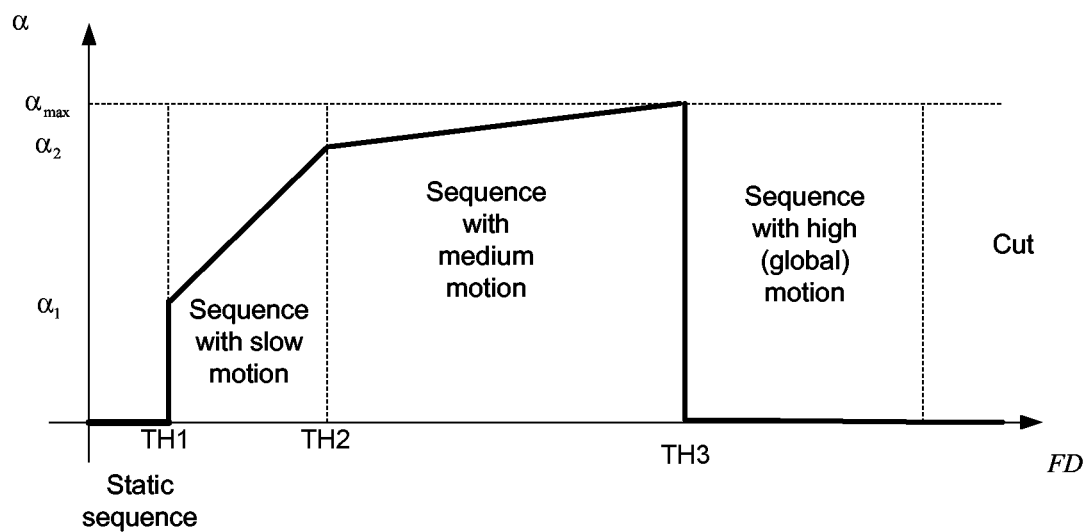

Other characteristics and advantages of the invention will appear through the description of a non-limiting embodiment of the invention, which will be illustrated, with the help of the enclosed drawings, wherein:

FIG. 1 represents a general flow-chart of a preferred embodiment of the method of spatial saliency map construction applied to a black and white image, FIG. 2 represents a general flow-chart of a preferred embodiment of a method of spatial saliency map construction applied to a color image, FIG. 3 represents the psycho visual spatial frequency partitioning for the achromatic component, FIG. 4 represents the psycho visual spatial frequency partitioning for the chromatic components, FIG. 5 represents the Daily Contrast Sensitivity Function, FIGS. 6a and 6b represent respectively the visual masking and a non linear model of masking, FIG. 7 represents the flow-chart of the normalisation step according to the preferred embodiment, FIG. 8 represents the inhibition/excitation step, FIG. 9 represents the profile of the filters to model facilitative interactions for $\theta=0$, FIG. 10 represents an illustration of the operator $D(z)$, FIG. 11 represents the chromatic reinforcement step, FIG. 12 represents the non CRF exhibition caused by the adjacent areas of the CRF flanks, FIG. 13 represents a profile example of the normalized weighting function for a particular orientation and radial frequency, FIG. 14 represents a general flow-chart of an embodiment of a method of temporal saliency map construction, FIG. 15 represents a general flow-chart of an embodiment of a method for constructing a saliency map based on spatial and temporal activity, FIG. 16 represents the variation of the coefficient $\alpha$ according to the spatio-temporal activity FD.

FIG. 1 represents the general flow-chart of a preferred embodiment of the method according to the invention applied to a black and white image.

The algorithm is divided in three main parts.

The first one named visibility is based on the fact that the human visual system (HVS) has a limited sensitivity. For example, the HVS is not able to perceive with a good precision all signals in your real environment and is insensible to small stimuli. The goal of this first step has to take into account these intrinsic limitations by using perceptual decomposition, contrast sensitivity functions (CSF) and masking functions.

The second part is dedicated to the perception concept. The perception is a process that produces from images of the external world a description that is useful to the viewer and not cluttered with irrelevant information. To select relevant information, a center surround mechanism is notably used in accordance with biological evidences.

The last step concerns some aspects of the perceptual grouping domain. The perceptual grouping refers to the human visual ability to extract significant images relations from lower level primitive image features without any knowledge of the image content and group them to obtain meaningful higher-level structure. The proposed method just focuses on contour integration and edge linking.

Steps E3, E4 are executed on the signal in the frequential domain.

Steps E1, E6 and E9 are done in the spatial domain.

Steps E7 and E8 are done in the frequential or spatial domain. If they are done in the frequential domain, a Fourier transformation has to be carried on before step E7 and an inverse Fourier transformation has to be carried out before step E9.

In step E1, the luminance component is extracted from the considered image.

In step E2, the luminance component is transposed into the frequency domain by using known transformations such as the Fourier transformation in order to be able to apply in step E3, the perceptual sub-band decomposition on the image.

In step E3, a perceptual decomposition is applied on the luminance component. This decomposition is inspired from the cortex transform and based on the decomposition proposed in the document "The computation of visual bandwidths and their impact in image decomposition and coding", International Conference and Signal Processing Applications and Technology, Santa-Clara, Calif., pp. 776-770, 1993. This decomposition is done according to the visibility threshold of a human eye.

The decomposition, based on different psychophysics experiments, is obtained by carving up the frequency domain both in spatial radial frequency and orientation. The perceptual decomposition of the component A leads to 17 psycho visual sub-bands distributed on 4 crowns as shown on FIG. 3.

The shaded region on the FIG. 3 indicates the spectral support of the sub-band belonging to the third crown and having an angular selectivity of 30 degrees, from 15 to 45 degrees.

Four domains (crowns) of spatial frequency are labeled from I to IV:

I: spatial frequencies from 0 to 1.5 cycles per degree;
II: spatial frequencies from 1.5 to 5.7 cycles per degree;
III: spatial frequencies from 5.7 to 14.2 cycles per degree;
IV: spatial frequencies from 14.2 to 28.2 cycles per degree.

The angular selectivity depends on the considered frequency domain. For low frequencies, there is no angular selectivity.

The main properties of these decompositions and the main differences from the cortex transform are a non-dyadic radial selectivity and an orientation selectivity that increases with the radial frequency.

Each resulting sub-band may be regarded as the neural image corresponding to a population of visual cells tuned to a range of spatial frequency and a particular orientation. In fact, those cells belong to the primary visual cortex (also called striate cortex or V1 for visual area 1). It consists of about 200 million neurons in total and receives its input from the lateral geniculate nucleus. About 80 percent of the cells are selective for orientation and spatial frequency of the visual stimulus.

On the image spatial spectrum, a well-known property of the HVS is applied, which is known as the contrast sensitivity function (CSF). The CSF applied is a multivariate function mainly depending on the spatial frequency, the orientation and the viewing distance.

Biological evidences have shown that visual cells response to stimuli above a certain contrast. The contrast value for which a visual cell response is called the visibility threshold (above this threshold, the stimuli is visible). This threshold varies with numerous parameters such as the spatial frequency of the stimuli, the orientation of the stimuli, the viewing distance, . . . . This variability leads us to the concept of the CSF which expresses the sensitivity of the human eyes (the sensitivity is equal to the inverse of the contrast threshold) as a multivariate function. Consequently, the CSF permits to assess the sensitivity of the human eyes for a given stimuli.

In step E4, a 2D anisotropic CSF designed by Daily is applied. Such a CSF is described in document "the visible different predictor: an algorithm for the assessment of image fidelity", in proceedings of SPIE Human vision, visual processing and digital display III, volume 1666, pages 2-15, 1992.

The CSF enables the modelisation of an important property of the eyes, as the HVS cells are very sensitive to the spatial frequencies.

On FIG. 5, the Daily CSF is illustrated.

Once the Daily function has been applied, an inverse Fourier Transformation is applied on the signal in step E5, in order to be able to apply the next step E6.

For natural pictures, the sensitivity can be modulated (increased or decreased the visibility threshold) by the presence of another stimulus. This modulation of the sensitivity of the human eyes is called the visual masking, as done in step E6.

An illustration of masking effect is shown on the FIGS. 6a and 6b. Two cues are considered, a target and a masker where $C_T$ and $C_M$ are the contrast threshold of the target in the presence of the masker and the contrast of the masker respectively. Moreover, $C_{T0}$ is the contrast threshold measured by a CSF (without masking effect).

On FIG. 6a, when $C_M$ varies, three regions can be defined:

At low values of $C_M$, the detection threshold remains constant. The visibility of the target is not modified by the masker.

When $C_M$ tends toward $C_{T0}$, the masker eases the detection of the target by decreasing the visibility threshold. This phenomenon is called facilitative or pedestal effect.

When $C_M$ increases, the target is masked by the masker. His contrast threshold increases.

On FIG. 6b, the facilitative area is suppressed.

The visual masking method is based on the detection of a simple signal as sinusoidal patterns.

There are several other methods to achieve the visual masking modeling based on psychophysics experiments: for instance, another method refers to the detection of quantization noise.

It is obvious that the preferred method is a strong simplification as regard the intrinsic complexity of natural pictures. Nevertheless, numerous applications (watermarking, video quality assessment) are built around such principle with interesting results compared to the complexity.

In the context of sub-band decomposition, masking has been intensively studied leading to define three kinds of masking: intra-channel masking, inter-channel masking and inter-component masking.

The intra-channel masking occurs between signals having the same features (frequency and orientation) and consequently belonging to the same channel. It is the most important masking effect.

The inter-channel masking occurs between signals belonging to different channels of the same component.

The inter-component masking occurs between channels of different components (the component A and one chromatic component for example). These two last visual masking are put together and are just called inter-masking in the following.

For the achromatic component, we use the masking function designed by Dally in document entitled "A visual model for Optimizing the Design of Image Processing Algorithms", in IEEE international conferences on image processing, pages 16-20, 1994, in spite of the fact that this model doesn't take into account the pedestal effect. The strength of this model lies in the fact that it has been optimized with a huge amount of experimental results.

The variation of the visibility threshold is given by:

$$T_{i,j,A}^{intra}(m,n)=(1+(k_1(k_2|R_{i,j}(m,n)|)^s)^b)^{1/b}$$

where $R_{i,j}$ is a psycho visual channel stemming from the perceptual channel decomposition (For example, the shaded region on the FIG. 3 leads to the channel $R_{III,2}$). The values $k_1$, $k_2$, s, b are given below:

k1=0.0153
k2=392.5

The below table gives the values of s and b according to the considered sub-band:

| Sub-band | s | b |
|---|---|---|
| I | 0.75 | 4 |
| II | 1 | 4 |
| III | 0.85 | 4 |
| IV | 0.85 | 4 |

We get the signal $R_{i,j}^1(x,y)$ at the output of the masking step.

$$R_{i,j}^1(x,y)=R_{i,j}(x,y)/T_{i,j}(x,y)$$

Then, in step E7, the step of normalization enables to extract the main important information from the sub-band. Step E7 is detailed on FIG. 7.

In reference to FIG. 7, in step S1, a first sub-band $R_{i,j}^1(x,y)$ is selected. The steps S2 to S4 are carried on for each sub-band $R_{i,j}^1(x,y)$ of the 17 sub-bands.

The steps S5 to S7 are done for the second crown (II).

i represents the spatial radial frequency band, I belongs to {I, II, III, IV}.

j represents the orientation, j belongs to {1, 2, 3, 4, 5, 6}.

(x,y) represent the spatial coordinates.

In other embodiments, the different steps can be carried out on all the sub-bands.

Steps S2 and S3 aim to modelize the behavior of the classical receptive field (CRF).

The concept of CRF permits to establish a link between a retinal image and the global percept of the scene. The CRF is defined as a particular region of visual field within which an appropriate stimulation (with preferred orientation and frequency) provokes a relevant response stemming from visual cell. Consequently, by definition, a stimulus in the outer region (called surround) cannot activate the cell directly.

The inhibition and excitation in steps S2 and S3 are obtained by a Gabor filter, which is sensible as for the orientation and the frequency.

The Gabor filter can be represented as following:

$$gabor(x,y,\sigma_x,\sigma_y,f,\theta)=G_{\sigma_x,\sigma_y}(x_\theta,y_\theta)\cos(2\pi f x_\theta)$$

f being the spatial frequency of the cosinus modulation in cycles per degree (cy/°).

$(x_\theta, y_\theta)$ are obtained by a translation of the original coordinates $(x_0,y_0)$ and by a rotation of $\theta$, $$\begin{bmatrix} x_\theta \\ y_\theta \end{bmatrix} = \begin{bmatrix} \cos\theta & \sin\theta \\ -\sin\theta & \cos\theta \end{bmatrix}\begin{bmatrix} x-x_0 \\ y-y_0 \end{bmatrix}$$

$$G_{\sigma_x,\sigma_y}(x,y) = A\exp\left\{-\left(\frac{x}{\sqrt{2}\,\sigma_x}\right)^2 - \left(\frac{y}{\sqrt{2}\,\sigma_y}\right)^2\right\}$$

A representing the amplitude, $\sigma_x$ et $\sigma_y$ representing the width of the gaussian envelop along the x and y axis respectively.

$$\text{excitation}(x, y, \sigma_x, \sigma_y, f, \theta) = \begin{cases} gabor(x, y, \sigma_x, \sigma_y, f, \theta) & \text{if } -1/(4f) \le x_\theta \le 1/(4f) \\ 0 & \text{otherwise} \end{cases}$$

In order to obtain elliptic shapes, we take different variances $\sigma_x < \sigma_y$.

Finally, we get the output of step E2:

$$R_{i,j}^{EX}(x,y)=R_{i,j}^1(x,y)*\text{excitation}(x,y,\sigma_x,\sigma_y,f,\theta)$$

In step S3, the inhibition is calculated by the following formula:

$$\text{inhibition}(x, y, \sigma_x, \sigma_y, f, \theta) = \begin{cases} 0 & si -1/(4f) \le x_\theta \le 1/(4f) \\ |gabor(x, y, \sigma_x, \sigma_y, f, \theta)| & sinon. \end{cases}$$

And finally:

$$R_{i,j}^{INH}(x,y)=R_{i,j}^1(x,y)*\text{inhibition}(x,y,\sigma_x,\sigma_y,f,\theta)$$

In step S4, the difference between the excitation and the inhibition is done. The positive components are kept, the negative components are set to "0". This is the following operation, $$R_{i,j}^2(x,y)=|R_{i,j}^{Exc}(x,y)-R_{i,j}^{Inh}(x,y)|_{<0}$$

In step S5, for each orientation, for each sub-band of the second domain, two convolution products are calculated:

$$L_{i,j}^0(x,y)=R_{i,j}^2)(x,y)*B_{i,j}^0(x,y)$$

$$L_{i,j}^1(x,y)=R_{i,j}^2(x,y)*B_{i,j}^1(x,y)$$

$B_{i,j}^0(x,y)$ and $B_{i,j}^1(x,y)$ are 2 half-butterfly filters. The profile of these filters allow the modelling of facilitative interactions for $\theta=0$ given on FIG. 9. These filters are defined by using a bipole/butterfly filter.

It consists of a directional term $D_\theta(x,y)$ and a proximity term generated by a circle $C_r$ blurred by a gaussian filter $G_{\sigma_x,\sigma_y}(x,y)$. The circle radius consists in two visual degrees; A visual degree consisting in a number of pixels, said number being dependant on the display resolution and on the observation distance.

$$B_{\theta_{i,j},\alpha,r,\sigma}(x,y) = D_{\theta_{i,j}}(x,y) \cdot C_r * G_{\sigma_x,\sigma_y}(x,y)$$

with $$D_{\theta_{i,j}}(x, y) = \begin{cases} \cos\left(\frac{\pi/2}{\alpha}\varphi\right) & si \ \varphi < \alpha \\ 0 & sinon. \end{cases}$$

and $\phi = \arctan(y'/x')$, where $(x',y')^T$ is the vector $(x,y)^T$ rotated by $\theta_{i,j}$. The parameter $\alpha$ defines the opening angle $2\alpha$ of the bipole filter. It depends on the angular selectivity $\gamma$ of the considered sub-band. We take $\alpha = 0.4 \times \gamma$. The size of the bipole filter is about twice the size of the CRF of a visual cell.

In step S6, we compute the facilitative coefficient:

$$f_{i,j}^{iso}(x, y) = D\left(\frac{L_{i,j}^1(x, y) + L_{i,j}^0(x, y)}{|L_{i,j}^1(x, y) - L_{i,j}^0(x, y)|}\right)$$

$$D(z) = \begin{cases} 0, z \le s_1, \\ \alpha_1, z \le s_2, \\ \cdots \\ \alpha_{N-1}, z \le s_{N-1} \end{cases} \text{ where } \alpha_i \le 1, i \in [0 \ldots N-1]$$

An illustration of the operator $D(z)$ is given on FIG. 9.

To ease the application of the facilitative coefficient, the operator $D(z)$ ensures that the facilitative coefficient is constant by piece as shown on FIG. 9.

In step S7, the facilitative coefficient is applied to the normalized result obtained in step S4.

$$R_{i,j}^3(x,y) = R_{i,j}^2(x,y) \times (1 + f_{i,j}^{iso}(x,y))$$

Going back to step E8 of FIG. 1, after step S7 of FIG. 7, the four saliency maps obtained for the domain II are combined to get the whole saliency map according to the following formula:

$$\text{fixation}(x,y) = \alpha \times R_{II,0}^3(x,y) + \beta \times R_{II,1}^3(x,y) + \chi \times R_{II,2}^3(x,y) + \delta \times R_{II,3}^3(x,y)$$

$\alpha, \beta, \chi, \delta$ represent weighting coefficients which depend on the application (watermarking, coding . . . ).

In other embodiments, the saliency map can be obtained by a calculation using the whole 17 sub-bands and not only the sub-bands of domain II.

FIG. 2 represents the general flow-chart of a preferred embodiment of the method according to the invention applied to a colour image.

Steps T1, T4, T'4, T"4, T5 and T8 are done in the spatial domain.

Steps T2, T'2, T"2, T3, T'3, T"3 are done in the frequencial domain.

A Fourier transformation is applied on three components between step T1 and steps T2, T'2, T"2.

An inverse Fourier transformation is applied between respectively T3, T'3, T"3 and T4, T'4 and T"4.

Steps T6 and T7 can be done in the frequential or spatial domain. If they are done in the frequential domain, a Fourier transformation is done on the signal between steps T5 and T6 and an inverse Fourier transformation is done between steps T7 and T8.

Step T1 consists in converting the RGB luminances into the Krauskopf's opponent-colors space composed by the cardinal directions A, Cr1 and Cr2.

This transformation to the opponent-colors space is a way to decorrelate color information. In fact, it's believed that the brain uses 3 different pathways to encode information: the first conveys the luminance signal (A), the second the red and green components (Cr1) and the third the blue and yellow components (Cr2).

These cardinal directions are in closely correspondence with signals stemming from the three types of cones (L,M,S) of the eye.

Each of the three components RGB firstly undergoes a power-law non linearity (called gamma law) of the form $x^\gamma$ with $\gamma \approx 2.4$. This step is necessary in order to take into account the transfer function of the display system. The CIE (French acronym for "commission internationale de l'éclairage") XYZ tristimulus value which form the basis for the conversion to an HVS color space is then computed by the following equation:

$$\begin{pmatrix} X \\ Y \\ Z \end{pmatrix} = \begin{pmatrix} 0.412 & 0.358 & 0.18 \\ 0.213 & 0.715 & 0.072 \\ 0.019 & 0.119 & 0.95 \end{pmatrix} \begin{pmatrix} R \\ G \\ B \end{pmatrix}$$

The response of the (L,M,S) cones are computed as follows:

$$\begin{pmatrix} L \\ M \\ S \end{pmatrix} = \begin{pmatrix} 0.240 & 0.854 & -0.0448 \\ -0.389 & 1.160 & 0.085 \\ -0.001 & 0.002 & 0.573 \end{pmatrix} \begin{pmatrix} X \\ Y \\ Z \end{pmatrix}$$

From the LMS space, one has to obtain an opponent color space. There is a variety of opponent color space, which differ in the way to combine the different cones responses. From experimental experiments, the color space designed by Krauskopf have been validated and it is given by the following transformation:

$$\begin{pmatrix} A \\ Cr1 \\ Cr2 \end{pmatrix} = \begin{pmatrix} 1 & 1 & 0 \\ 1 & -1 & 0 \\ -0.5 & -0.5 & 1 \end{pmatrix} \begin{pmatrix} L \\ M \\ S \end{pmatrix}$$

Then, in step T2, a perceptual decomposition is applied to the luminance component. Preliminary to step T2 and further to step T1, the luminance component is transposed into the frequency domain by using known transformations such as the Fourier transformation in order to be able to apply in step T2, the perceptual sub-band decomposition on the image.

The perceptual sub-band decomposition of step T2 is the same as the step E3 of FIG. 1, and thus will not be described here, as described earlier.

Concerning the decomposition of chromatic components Cr2 and Cr1, of steps T'2 and T"2 as shown on FIG. 4, the decomposition leads to 5 psychovisual sub-bands for each of these components distributed on 2 crowns. Preliminary to steps T'2, T"2 and further to step T1, the chrominance components are transposed into the frequency domain by using known transformations such as the Fourier transformation in order to be able to apply in step T'2 and T"2, the perceptual sub-band decomposition on the image.

Two domains of spatial frequency are labeled from I to II:
I: spatial frequencies from 0 to 1.5 cycles per degree,
II: spatial frequencies from 1.5 to 5.7 cycles per degree.

In steps T3, T'3 and T"3, a contract sensitivity function (CSF) is applied.

In step T3, the same contrast sensitivity as in step E4 of FIG. 1 is performed on the luminance component and thus will not be described here.

In step T'3 and T"3, the same CSF is applied on the two chromatic components Cr1 and Cr2. On the two chromatic components, a two-dimensional anisotropic CSF designed by Le Callet is applied. It is described in document<<critères objectifs avec références de qualité visuelle des images couleurs>> of Mr Le Callet, university of Nantes, 2001.

This CSF uses two low-pass filters with a cut-off frequency of about 5.5 cycles per degree and 4.1 cycles per degree respectively for Cr1 and Cr2 components.

In order to permit the direct comparison between early visual features stemming from different visual modalities (achromatic and chromatic components), the sub-bands related to the visibility are weighted. The visibility threshold being defined as the stimulus's contrast at a particular point for which the stimulus just becomes visible.

An inverse Fourier transformation is then applied on the different components (not shown on FIG. 2) in order to be able to apply the masking in the spatial domain.

Then, an intra masking is applied on the different sub-bands for the chromatic components Cr1 and Cr2 during step T'4 and T"4 and for the achromatic component in step T4. This last step has already been explained in the description of FIG. 1, step E6. Thus, it will not be described again here.

Intra channel masking is incorporated as a weighing of the outputs of the CSF function. Masking is a very important phenomenon in perception as it describes interactions between stimuli. In fact, the visibility threshold of a stimulus can be affected by the presence of another stimulus.

Masking is strongest between stimuli located in the same perceptual channel or in the same sub-band. We apply the intra masking function designed by Dally on the achromatic component as described on FIG. 1, step E6 and, on the color component, the intra masking function described in document of P. Le Callet and D. Barba, "Frequency and spatial pooling of visual differences for still image quality assessment", in Proc. SPIE Human Vision and Electronic Imaging Conference, San Jose, Calif., Vol. 3959, January 2000.

These masking functions consist of non linear transducer as expressed in document of Legge and Foley, "Contrast Masking in Human Vision", Journal of the Optical Society of America, Vol. 70, N° 12, pp. 1458-1471, December 1980.

Visual masking is strongest between stimuli located in the same perceptual channel (intra-channel masking). Nevertheless, as shown in numerous studies, there are several interactions called inter-component masking providing a masking or a pedestal effect. From psychophysics experiments, significant inter-components interactions involving the chromatic components have been elected. Consequently, the sensitivity of achromatic component could be increased or decreased by the Cr1 component. The influence of the Cr2 on the achromatic component is considered insignificant. Finally, the Cr1 can also modulate the sensitivity of Cr2 component (and vice versa).

Then in step T5, a chromatic reinforcement is done.

The colour is one of the strongest attractor of the attention and the invention wants to take advantage of this attraction strength by putting forward the following property: the existence of regions showing a sharp colour and fully surrounded of areas having quite other colours implies a particular attraction to the borders of this region.

To avoid the difficult issue of aggregating measures stemming from achromatic and chromatic components, the colour facilitation consists in enhancing the saliency of achromatic structure by using a facilitative coefficient computed on the low frequencies of the chromatic components.

In the preferred embodiment, only a sub-set of the set of achromatic channels is reinforced. This subset contains 4 channels having an angular selectivity equal to $\pi/4$ and a spatial radial frequency (expressed in cyc/deg) belonging to [1.5, 5.7]. One notes these channels $R_{i,j}$ where i represents the spatial radial frequency and j pertains to the orientation. In our example, j is equal to $\{0, \pi/4, \pi/2, 3\pi/4\}$. In order to compute a facilitative coefficient, one determines for each pixel of the low frequency of Cr1 and Cr2 the contrast value related to the content of adjacent areas and to the current orientation of the reinforced achromatic channel as illustrated on the FIG. 11. On FIG. 11, the contrast value is obtained by computing the absolute difference between the average value of the set A and the average value of the set B. The sets A and B belong to the low frequency of Cr1 or Cr2 and are oriented in the preferred orientation of the considered achromatic channel.

The chromatic reinforcement is achieved by the following equation, on an achromatic (luminance) channel $R_{i,j}(x,y)$.

$$R'_{i,j}(x,y) = R_{i,j}(x,y) \times (1 + |A-B|_{Cr1} + |A-B|_{Cr2})|_{i=II}$$

where, $R'_{i,j}(x,y)$ represents the reinforced achromatic sub-band, $R_{i,j}(x, y)$ represents an achromatic sub-band.

$|A-B|_k$ represents the contrast value computed around the current point on the chromatic component k in the preferred orientation of the sub-band $R_{i,j}(x,y)$, as shown on FIG. 7. In the embodiment, the sets A and B belong to the sub-band of the first crown (low frequency sub-band) of the chromatic component k with an orientation equal to $\pi/4$.

In other embodiments, all the sub-bands can be considered.

In step T6, a center/surround suppressive interaction is carried on.

This operation consists first in a step of inhibition/excitation.

A two-dimensional difference-of-Gaussians (DoG) is used to model the non-CRF inhibition behavior of cells. The $DoG_{\sigma_x^{ex}, \sigma_y^{ex}, \sigma_x^{inh}, \sigma_y^{inh}}(x,y)$ is given by the following equation:

$$DoG_{\sigma_x^{ex},\sigma_y^{ex},\sigma_x^{inh},\sigma_y^{inh}}(x,y) = G_{\sigma_x^{inh},\sigma_y^{inh}}(x,y) - G_{\sigma_x^{ex},\sigma_y^{ex}}(x,y)$$

with $$G_{\sigma_x,\sigma_y}(x, y) = \frac{1}{2\pi(\sigma_x\sigma_y)^2} \exp\left(-\frac{x^2}{2\sigma_x^2} - \frac{y^2}{2\sigma_y^2}\right)$$

a two-dimensional gaussian.

Parameters $\sigma_x^{ex}, \sigma_y^{ex}$ and $\sigma_x^{inh}, \sigma_y^{inh}$ correspond to spatial extends of the Gaussian envelope along the x and y axis of the central Gaussian (the CRF center) and of the inhibitory Gaussian (the surround) respectively. These parameters have been experimentally determined in accordance with the radial frequency of the second crown (the radial frequency $f \in [1.5, 5.7]$ is expressed in cycles/degree). Finally, the non-classical surround inhibition can be modeled by the normalized weighting function $w_{\sigma_x^{ex},\sigma_y^{ex},\sigma_x^{inh},\sigma_y^{inh}}(x,y)$ given by the following equation:

$$w_{\sigma_x^{ex},\sigma_y^{ex},\sigma_x^{inh},\sigma_y^{inh}}(x, y) = \frac{1}{\left\|H\left(DoG_{\sigma_x^{ex},\sigma_y^{ex},\sigma_x^{inh},\sigma_y^{inh}}\right)\right\|_1} H\left(DoG_{\sigma_x^{ex},\sigma_y^{ex},\sigma_x^{inh},\sigma_y^{inh}}(x', y')\right)$$

with, $$H(z) = \begin{cases} 0, & z < 0 \\ z, & z \geq 0 \end{cases}$$

(x',y') is obtained by translating the original coordinate system by $(x_0, y_0)$ and rotating it by $\theta_{i,j}$ expressed in radian, $$\begin{bmatrix} x' \\ y' \end{bmatrix} = \begin{bmatrix} \cos\theta_{i,j} & \sin\theta_{i,j} \\ -\sin\theta_{i,j} & \cos\theta_{i,j} \end{bmatrix} \begin{bmatrix} x - x_0 \\ y - y_0 \end{bmatrix},$$

$\|.\|_1$ denotes the $L_1$ norm, i.e the absolute value.

The FIG. 12 shows the structure of non-CRF inhibition.

The FIG. 13 shows a profile example of the normalized weighting function $w_{\sigma_x^{ex}, \sigma_y^{ex}, \sigma_x^{inh}, \sigma_y^{inh}}(x,y)$.

The response $R_{i,j}^{(2)}(x,y)$ of cortical cells to a particular sub-band $R_{i,j}^{(1)}(x,y)$ is computed by the convolution of the sub-band $R_{i,j}^{(1)}(x,y)$ with the weighting function $w_{\sigma_x^{ex}, \sigma_y^{ex}, \sigma_x^{inh}, \sigma_y^{inh}}(x,y)$:

$$R_{i,j}^{(2)}(x,y) = H(R_{i,j}^{(1)}(x,y) - R_{i,j}^{(1)}(x,y) * w_{\sigma_x^{ex}, \sigma_y^{ex}, \sigma_x^{inh}, \sigma_y^{inh}}(x,y))|_{i=II}$$

with H(z) defined as has been described above.

In step T7, a facilitative interaction is carried on.

This facilitative interaction is usually termed contour enhancement or contour integration.

Facilitative interactions appear outside the CRF along the preferred orientation axis. These kinds of interactions are maximal when center and surround stimuli are iso-oriented and co-aligned. In other words, as shown by several physiologically observations, the activity of cell is enhanced when the stimuli within the CRF and a stimuli within the surround are linked to form a contour.

Contour integration in early visual preprocessing is simulated using two half butterfly filter $B_{i,j}^0$, and $B_{i,j}^1$. The profiles of these filters are shown on the 9 and they are defined by using a bipole/butterfly filter. It consists of a directional term $D_\theta(x,y)$ and a proximity term generated by a circle $C_r$ blurred by a gaussian filter $G_{\sigma_x, \sigma_y}(x,y)$.

$$B_{\theta_{i,j}, \alpha, r, \sigma}(x,y) = D_{\theta_{i,j}}(x,y) \cdot C_r * G_{\sigma_x, \sigma_y}(x,y)$$

with $$D_{\theta_{i,j}}(x,y) = \begin{cases} \cos\left(\frac{\pi/2}{\alpha}\varphi\right) & \text{si } \varphi < \alpha \\ 0 & \text{sinon.} \end{cases}$$

and $\phi = \arctan(y'/x')$, where $(x',y')^T$ is the vector $(x,y)^T$ rotated by $\theta_{i,j}$. The parameter $\alpha$ defines the opening angle $2\alpha$ of the bipole filter. It depends on the angular selectivity $\gamma$ of the considered sub-band. One takes $\alpha = 0.4 \times \gamma$. The size of the bipole filter is about twice the size of the CRF of a visual cell.

The two half butterfly filter $B_{i,j}^0$ and $B_{i,j}^1$ after deduced from the butterfly filter by using appropriate windows.

For each orientation, sub-band and location, one computes the facilitative coefficient:

$$f_{i,j}^{iso}(x,y) = D\left(\frac{L_{i,j}^1(x,y) + L_{i,j}^0(x,y)}{|L_{i,j}^1(x,y) - L_{i,j}^0(x,y)|}\right)$$

$$L_{i,j}^0(x,y) = R_{i,j}^{(2)}(x,y) * B_{i,j}^0(x,y),$$

$$L_{i,j}^1(x,y) = R_{i,j}^{(2)}(x,y) * B_{i,j}^1(x,y),$$

$$D(z) = \begin{cases} 0, & z \leq s_1, \\ \alpha_1, & z \leq s_2, \\ \vdots \\ \alpha_{N-1}, & z \leq s_{N-1} \end{cases} \text{ where}$$

An illustration of the operator D(z) is given on FIG. 9.

The sub-band $R_{i,j}^{(3)}$ resulting from the facilitative interaction is finally obtained by weighting the sub-band $R_{i,j}^{(2)}$ by a factor depending on the ratio of the local maximum of the facilitative coefficient $f_{i,j}^{iso}(x,y)$ and the global maximum of the facilitative coefficient computed on all sub-bands belonging to the same range of spatial frequency:

$$R_{i,j}^{(3)}(x,y) = R_{i,j}^{(2)}(x,y) \times \left(1 + \eta^{iso} \times \frac{\max_{(x,y)}(f_{i,j}^{iso}(x,y))}{\max_j\left(\max_{(x,y)}(f_{i,j}^{iso}(x,y))\right)} f_{i,j}^{iso}(x,y)\right)\Bigg|_{i=II}$$

From a standard butterfly shape, this facilitative factor permits to improve the saliency of isolated straight lines. $\eta^{iso}$ permits to control the strength of this facilitative interaction.

In step E8, the saliency map is obtained by summing all the resulting sub-bands obtained in step E7.

$$S(x,y) = \sum_{i=II,j} R_{i,j}^{(3)}(x,y)$$

In other embodiments of the invention, one can use all the sub-bands and not only the sub-bands of the second crown.

Although cortical cells tuned to horizontal and vertical orientations are almost as numerous as cells tuned to other orientations, we don't introduce any weighting. This feature of the HVS is implicitly mimic by the application of 2D anisotropic CSF.

FIG. 14 represents a preferred embodiment of a general flow-chart of an embodiment of a method of temporal saliency map construction.

The method consists in determining the areas of the image showing a movement contrast. An area can be considered as an area showing movement contrast if:

it is a fixed item on a movement background it is a moving object on a static background.

The areas showing movement contrast are areas which attract the human eye.

A perceptual sub-band decomposition is done on an image of a video sequence in step a1. This step corresponds to step E3 of FIG. 1. After the sub-bands are obtained, an intra masking is done on these sub-bands as shown on FIG. 5, steps T4, T'4, T"4. the sub-bands are referred as $\tilde{R}_{i,j}(x,y)$.

When the different perceptual sub-bands are obtained, a four level pyramid is constructed in step a2. One level is called $L_i$.

$$L_0(x,y) = \tilde{R}_{0,0}(x,y)$$

$$L_1(x,y) = L_0(x,y) + \sum_{i=0}^{3} \tilde{R}_{1,i}(x,y)$$

$$L_2(x,y) = L_1(x,y) + \sum_{i=0}^{5} \tilde{R}_{2,i}(x,y)$$

$$L_3(x,y) = L_2(x,y) + \sum_{i=0}^{5} \tilde{R}_{3,i}(x,y)$$

$L_0$ represents the low level frequency of the perceptual sub-band decomposition, $L_1$ represents the sum of $L_0$ and of the 4 sub-bands of the second crown of FIG. 3, $L_2$ represents the sum of $L_1$ and of the 6 sub-bands of the third crown on FIG. 3, $L_3$ represents the sum of $L_2$ and of the 6 sub-bands of the fourth crown on FIG. 3.

In step a3, a local hierarchical movement estimation is performed on the current image based on the different levels $L_i$.

The movement estimator is a movement estimator of pixel recursive type. The movement estimation is performed between the current image I(t) and a previous image I(t−nT).

The image L3 represents the full resolution. The image L2 represents a sub-sampled image by a factor 2 in both dimensions. The image L1 is sub-sampled by a factor 4 in both dimensions and finally the image L0 is sub-sampled by a factor 16 in both dimensions. Compared to a classical movement estimator, the obtained pyramid is not a dyadic pyramid. Thus, the hierarchical predictors have to be modified according to a scale factor.

In a step a4, a parametric model of the dominant movement is obtained using the movement vectors issued from the L3 image. Odobez and Bouthemy algorithm described in document "Robust multi resolution estimation of parametric motion models applied to complex scenes", internal publication 788 published by IRISA in 1994, is used and is described here. This document is included in this patent application content.

One important step consists in estimating the dominant global movement, represented by a 2 dimensions affine model. This estimation is determined from velocity vectors previously estimated $\vec{v}_{local}(s) = (dx, dy)^T$ with s being a pixel of the image.

The velocity vector for a pixel s coming from the affine movement parametrized by $\Theta$ is given by the following formula:

$$\vec{v}_\Theta(s) = (a_0 + a_1 x + a_2 y, b_0 + b_1 x + b_2 y)^T$$
$$\text{with } \Theta = [a_0, a_1, a_2, b_0, b_1, b_2)]$$

The estimation algorithm is based on an M-estimator, well known by the man skilled in the art, which minimises the sum of residual errors.

$$\hat{\Theta} = \operatorname*{argmin}_{\Theta} \sum_s \rho(ERR(s, \Theta))$$

The estimation of a residual error at a pixel s is given by $ERR(s, \Theta) = \vec{v}_{local}(s) - \vec{v}_\Theta(s)$.

The function $\rho(\ )$ is the German-McClure function. The robust estimator enables not to be sensitive to the secondary movements of the video sequence.

In order to obtain $\Theta$, the following steps are performed:

step 1: estimation using the least squares method: the estimated parameters are used for the initialisation of the second step, $$w(s) = \frac{\Psi(ERR(s, \Theta))}{ERR(s, \Theta)},$$

step 2: calculation for each pixel of the weighting:

step 3: estimation using the least squares weighted by the parameters w(s):

$$\hat{\Theta} = \operatorname*{argmin}_{\Theta} \sum_s w(s) \times (ERR(s, \Theta))^2$$

step 4: return to step 2 until $\Theta$ converges.

The influence function which is the derivative of $\rho(\ )$ is equal to $$\psi(e) = \frac{e}{(1 + e^2)^2}$$

where e represents the residual estimation error.

Back to FIG. 14, in a step a5, the temporal salient areas is determined as follows:

From the knowledge of the apparent dominant velocity $\vec{v}_\Theta$ and of the local velocity $\vec{v}_{local}$ for each pixel s, we can compute the relative motion $\vec{v}_{relatif}$:

$$\vec{v}_{relatif}(s) = \vec{v}_\Theta(s) - \vec{v}_{local}(s)$$

The eye is able to track interest objects undergoing a displacement, keeping them in the foveal region where the spatial sensitivity is at its highest. This tracking capability is known as smooth pursuit.

As the model has to yield a spatio-temporal saliency map attempting to simulate the behavior of an average observer, the tracking capability of the eye prevents us to use neither a spatio-temporal CSF nor a spatio-velocity CSF.

Smooth pursuit eye movements lead to the same visual sensitivity in moving objects as in stationary objects, as that blur and noise are equally visible in moving and in stationary objects. Therefore, one considers the worst case assumption that all moving areas of the sequence can be track by the viewers. Moreover, the spatio-temporal CSF is not space-time separable at lower frequencies.

Consequently, as the perception of a moving object heavily depends on whether or not the object is tracked by the eyes, one introduces the maximal pursuit velocity capability of the eyes $\vec{v}_{max}$.

$$\vec{v}_{relatif}(s) = \vec{v}_{relatif}(s) \times \frac{\vec{v}_{max}}{\|\vec{v}_{relatif}(s)\|} \text{ only if } \|\vec{v}_{relatif}(s)\| > \vec{v}_{max}$$

The computation of the relative motion cannot be sufficient to compute the temporal saliency map. It is intuitively clear that it is easy to find a moving stimulus among stationary distracters. Conversely, one has to consider the case where the dominant motion is important. In this situation, the relevancy of the relative motion has to be lessen since it is more difficult to detect a stationary stimulus among moving distractors. To cope with this problem, the relevancy of the relative motion depends on the global amount of relative motion. What one is concerned with here is the assessment of the average relative motion. To cope with this problem, a linear quantization is achieved in order to compute a histogram of the relative motion module. It seems that the median value of the quantized module of the relative motion, noted $\text{med}_{\|\vec{v}_{relatif}(s)\|_Q}$, is a good estimator of the quantity of relative motion. From this value, the normalized temporal saliency map is deduced:

$$S_{temporelle}(s) = \frac{\|\vec{v}_{relatif}(s)\|}{med_{\|\vec{v}_{relatif}(s)\|_Q}} \times \frac{1}{val_{max}} \text{ with}$$

$$val_{max} = \max_s \left( \frac{\|\vec{v}_{relatif}(s)\|}{med_{\|\vec{v}_{relatif}(s)\|_Q}} \right)$$

On FIG. 15, a complete embodiment of a method combining the spatial and the temporal saliency maps construction is shown, leading to the obtention of a global saliency map taking into account the temporal and spatial aspects in video sequences.

This figure is based on FIG. 1 where 4 steps E10-E13 have been added.

In parallel to the construction of the spatial saliency map, a temporal saliency map is obtained in steps E10-E12 as previously described in FIG. 14.

In step E13, the two saliency maps are fused in order to obtain the final saliency map.

The issue of fusion is tackled as a weighted generalized addition function, in spite of the fact that the salience of a stimulus is less than the sum of the salience of its visual features. If we guess that s1 and s2 are the saliency values stemming from two different visual features, the proposed final saliency s is computed by:

$$S(s) = \alpha \times S_{temporelle}(s) + (1-\alpha) \times S_{spatiale}(s) + \beta \times S_{spatiale}(s) \times S_{temporelle}(s)$$

where, the weighting coefficients control the sum and where the last term is called a reinforcement offset. This last is not negligible if and only if the two saliency values $s_{temporelle}$ and $s_{spatiale}$ are important.

$\alpha$ and $\beta$ coefficients can be adapted according to the application or according to the video content.

In this embodiment, $\alpha$ is deduced from the spatio-temporal activity of the sequence, assessing by the Frame Difference (FD) value:

$$FD = \frac{1}{col \times lig} \sum_{s=0}^{col \times lig} |I(s,t) - I(s,t-1)|$$

I(s,t) representing the luminance of the image at pixel s at instant t.

$\alpha$ is represented on FIG. 16.

In a static sequence, the value FD is null whereas a non null value FD is a sign of a spatio-temporal activity. It is worth noting that, when the value FD is really important, it means that the modification between the considered pictures is drastically important (in the most case, one is in the presence of a sequence cut). One proposes a non-linear function to determine the $\alpha$ coefficient.

Roughly speaking, three different behaviors can be identified:

FD<$TH_1$: the part of the sequence is nearly static. Obviously, one has only to consider the spatial saliency map ($\alpha=0$).

$TH_1$<FD<$TH_3$: there is more or less temporal activity in the considered part of the sequence. The coefficient $\alpha$ increases linearly with this activity. In this embodiment,
$\alpha_{max}=1$
$\alpha_2=0.65$
$\alpha_1=0.25$ FD>$TH_3$: the spatio-temporal activity is too important. There are at least two plausible explanations: first, there is a cut/shot in the video. Second, the two considered pictures undergo an important dominant motion (global translation, global panning, . . . ). In these cases, we have to set the $\alpha$ coefficient to zero in order to favor the spatial saliency map.

The coefficients TH1, TH2, TH3 depend on the spatial resolution.

The present embodiment is based on the perceptual sub-band decomposition. However the invention can be used on a frequency sub-band decomposition. A perceptual sub-band decomposition is based on a frequency sub-band decomposition followed by an orientation based decomposition.

The present embodiment is also based on a pixel recursive type movement estimator. In other embodiments one can use a block matching type movement estimator or any other movement estimator.

The present embodiment is based on video. However, it can be also applied to a fixed camera for video surveillance. In this case, the global movement is null, only the absolute movement is considered and the relative movement becomes an absolute movement.

The invention claimed is:

1. Method for creating a saliency map of an image comprising the step of hierarchical decomposition of the image into frequency sub-bands, comprising the steps of
movement estimation between current image and a preceding image calculated from the decomposition into frequency sub-bands,
estimating a dominant movement for the image and a local movement for each pixel of the current image,
obtaining a relative motion vector for each pixel of the image, being the difference between a local motion estimation and the dominant movement of the image of said pixel,
wherein it further comprises the steps of
if the value of a norm of the relative motion vector is higher than a maximal pursuit velocity of an eye, multiplying the relative motion vector by the maximal pursuit velocity of an eye over the norm of the relative motion vector,
computing a histogram of the module of the obtained relative motion vectors of an image in order to obtain a normalized temporal saliency map.

2. Method according to claim 1 wherein, further to the step of frequency sub-band decomposition, it comprises a step of orientation-based decomposition giving a perceptual sub-band decomposition.

3. Method according to claim 2 wherein it comprises a step of intra masking of different perceptual sub-bands.

4. Method according to claim 3 wherein it comprises:
a step of construction of a four-level pyramid,
a step of calculating a local motion vector for each pixel for each resolution level of the pyramid.

5. Method according to claim 4 wherein it comprises a step of obtaining a parametric model of the dominant movement of the image for each pixel of the image by using the local motion vectors obtained from a full resolution level of said four-level pyramid.

6. Method according to claim 1 wherein it comprises a step of computing a spatial saliency map of said image and a step of fusion of said normalized temporal saliency map and of said spatial saliency map.

* * * * *